Figure 1:
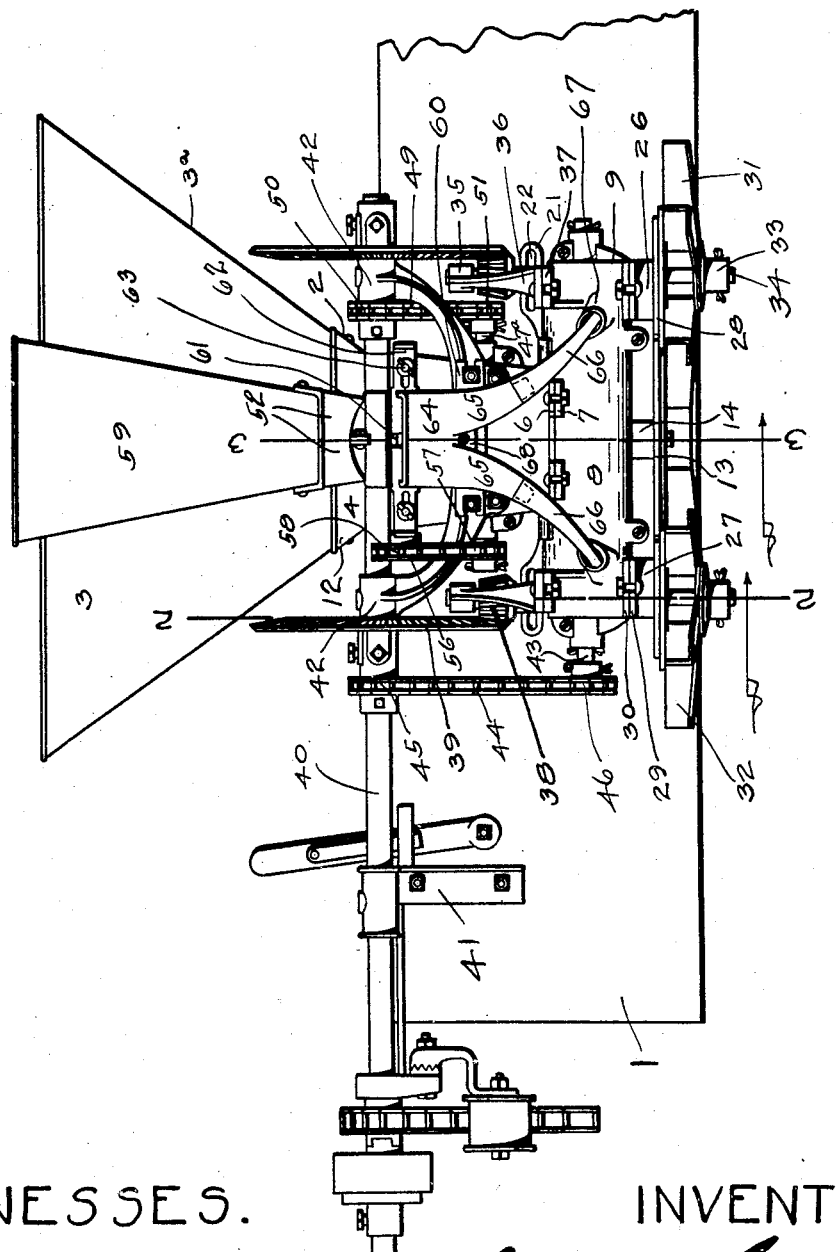

C. P. SESTER.
SEEDING MACHINE.
APPLICATION FILED MAY 25, 1914.

1,175,184.

Patented Mar. 14, 1916.
3 SHEETS—SHEET 1.

WITNESSES.

INVENTOR.

Charles P. Sester
BY
Labate & Bean
ATTYS.

C. P. SESTER.
SEEDING MACHINE.
APPLICATION FILED MAY 25, 1914.
1,175,184.
Patented Mar. 14, 1916.
3 SHEETS—SHEET 3.
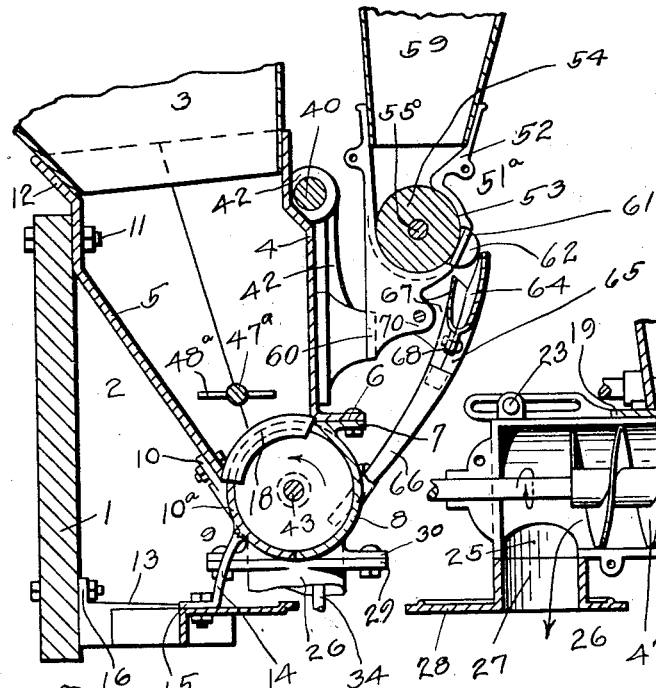
FIG. 3.
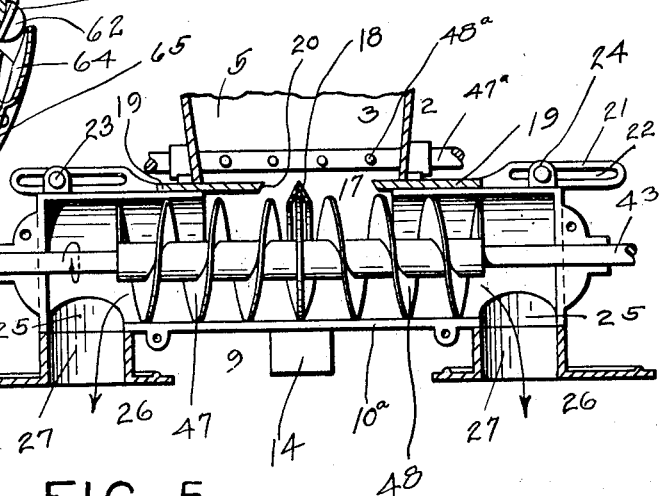
FIG. 4.
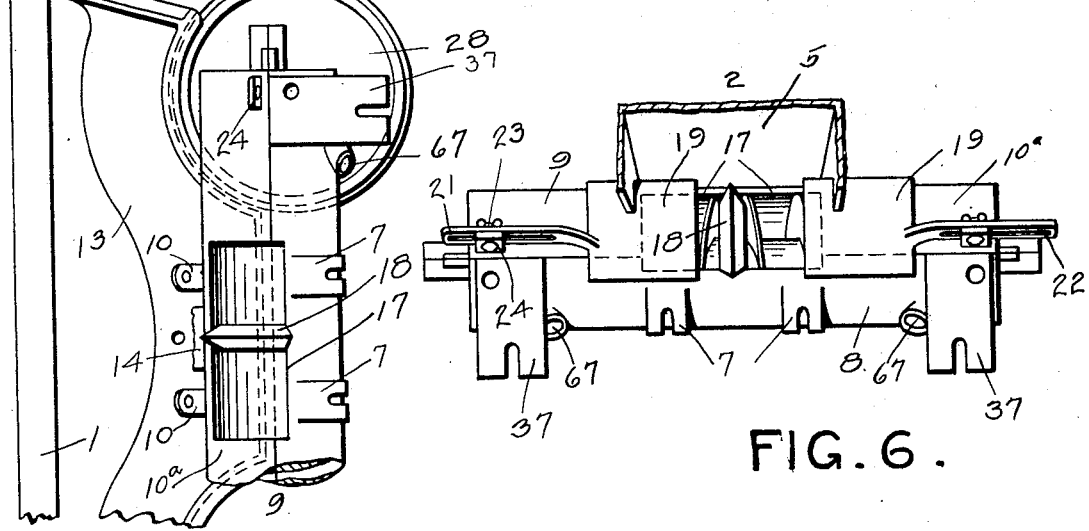
FIG. 5.
FIG. 6.
WITNESSES.
INVENTOR.
Charles P. Sester
BY LaPorte & Bean
ATTYS.

UNITED STATES PATENT OFFICE.

CHARLES P. SESTER, OF PEORIA, ILLINOIS.

SEEDING-MACHINE.

1,175,184.     Specification of Letters Patent.     Patented Mar. 14, 1916.

Application filed May 25, 1914. Serial No. 840,705.

*To all whom it may concern:*

Be it known that I, CHARLES P. SESTER, a citizen of the United States, and a resident of Peoria, in the county of Peoria and State of Illinois, have invented new and useful Improvements in Seeding-Machines, of which the following is a specification.

This invention has reference to certain new and useful improvements in seeding machines and has particular reference to the general type of broadcast or end-gate distributers, wherein two distributing fans are employed for receiving and distributing broadcast, seed or grain.

The invention has reference and is similar to the type of machines described and illustrated in prior patents granted to me, dated January 29th, 1907, No. 842,716 and July 16th 1907, No. 860,609.

The present invention combines the advantages present in the structures of the two aforementioned patents; that is to say, the advantages of a low down hopper which is present in my former Patent No. 842,716, has been embodied in the present structure and the advantages of the feeding and driving means shown in my former Patent No. 860,609, are also embodied in this present structure.

In my former Patent, No. 842,716, I arrange the distributing mechanism and grass seed attachment on one side of the end-gate and the hopper for containing the grain on the opposite side of the end-gate and interposed some suitable transferring or feeding means whereby the grain was conveyed, transferred or delivered from the grain hopper to the distributing fans. This made it possible to locate the distributing devices considerably lower than usual in machines of this type and also placed the upper end of the grain hopper considerably lower than heretofore. The advantage in lowering the top of the hopper containing the grain, was that the driver in shoveling the grain from the wagon body into the hopper, was not required to lift it as high as he would if the hopper were located in the usual manner high up upon the outside of the end-gate and therefore, there was less liability of the grain being accidentally thrown on to the ground instead of into the grain hopper. The grain is shoveled from the wagon into the hopper during the movement of the wagon and should the wagon give a lurch when the driver was lifting a shovel full of grain into the hopper, it is very probable and it often happened that a greater portion of the grain was thrown on to the ground than into the hopper. In the present construction, I place the distributing devices, the grass seed attachment and the grain hopper all on one side of the end-gate, which is substantially that arrangement shown in my former Patent No. 860,609, but I have so combined and arranged these parts introducing therein new features of construction, which enables me to locate the distributing devices substantially as low as that shown in my former Patent No. 842,716 and yet at the same time, obtain all of the advantages of a low down hopper, as embodied in said Patent No. 842,716, so that the grain hopper extends over the end-gate into the wagon body and at a height not much higher, if any, than shown in my said former Patent No. 842,716, so that a driver in shoveling grain from the wagon body to the hopper, is not required to lift it very high and there is little, if any liability of grain being thrown on to the ground instead of into the hopper and I obviate the feeding or transferring means through the end-gate from the grain hopper to the distributing devices, as shown, in my said Patent No. 842,716.

The object which I have in view, therefore, is to combine in a seeding machine of the type herein referred to, the distributing devices, grass seed attachment and grain hopper, which shall all be placed upon the outside of the end-gate, with the distributing devices located sufficiently low, that the grain and grass seed when discharged from the fans, will not be overly affected by the wind, and the grain hopper has the advantage of being placed very low and extending over into the body of the wagon which appeals to the farmer, owing to the little danger he will incur in the waste of grain when shoveling from the wagon body into the grain hopper, and combining in such structure, a force feeding device for delivering the grain from the grain hopper to the distributing devices, the feed of the same being controlled by suitable valves.

For a further and full description of the invention herein, and the merits thereof, and also to acquire knowledge of the details of construction of the means for affecting posed slide valves 19, which are duplicates of each other and the description of one will suffice for both.

The valve 19 slides on the upper surface of the tubular casing 9 and through an opening provided between the lower end of the hopper support 2 and said tubular casing 9, so that the inner end of the slide valve 19 may be caused to engage the partition 18 to cut off the flow of grain or opened to regulate the flow of grain into the tubular casing 9, as may be desired. The inner end of the slide valve 19 is tapered as at 20, which conforms to the incline of the face of the partition 18, so that a very tight closure may be made when the valve 19 is moved into its farthest point. The valve 19 has an arm extension 21 which is slotted as at 22 and passing through the slot is a bolt 23 which also passes through an ear 24, extending up from and forming a part of or suitably secured to one of the sections of the tubular casing 9. This provides a means of uniting and adjusting the valve 19 so that it may be fixed in any of its adjusted positions.

At the opposite lower ends of the tubular casing 9, the sections are cut away to provide the feed openings 25 in said casing. Depending from the opposite lower ends of the tubular casing 9 coincident and communicating with the feed openings 25, are the feed-ways 26. These feed-ways include the tubular necks 27 and the flanges 28 which overlie the distributing fans, to be described, and coöperate with the distributer shield and support 13. The feed-ways 26 are provided with flanges 29 which are bolted or otherwise suitably secured to flanges 30 extending from the sections forming the tubular casing 9, best seen in Figs. 2 and 3.

The distributing fans which have been referred to, are designated 31, each provided with suitable wings 32 for the proper distribution of the grain and grass seed delivered to the same, and said distributing fans are provided with hubs 33 by means of which they are carried on short vertical fan shafts 34. These shafts pass up through the feed-ways 26, through the feed openings 25 in the opposite ends of the tubular casing 9 and out through the upper part of the opposite ends of said tubular casing 9 and the outer upper ends of said shafts in addition to having a bearing in the upper portion of the casing 9, are journaled in bearings 35 of brackets 36. These brackets 36 are bolted or otherwise suitably secured to flange plates 37 extending from the tubular casing 9, as shown. On the fan shafts 34 between the bearings 35 of the brackets 36 and the tubular casing 9, are carried bevel pinions 38 which may be frictional pinions, ordinary bevel pinions or skew type of bevel pinions or helical bevel pinions. These pinions mesh with and are adapted to receive their power from corresponding bevel gear driving wheels 39 carried on a driving shaft 40. Said driving shaft 40 is arranged to receive its power from one of the rear ground wheels of the wagon supporting the end-gate or tailboard and seeding devices, but as this structure forms no part of the present invention, no description will be made of the same, although a suitable device for this purpose is shown in Fig. 1. The driving shaft 40 has a bearing in the bracket 41, secured to the end-gate or tailboard 1, and also has a bearing in brackets 42 which are bolted or otherwise suitably secured to the front face of the hopper support 2.

43 designates a shaft extending through the tubular casing 9 and having a journal bearing in the opposite ends of said casing. This shaft 43 is driven from the driving shaft 40 by means of a chain 44 engaging a sprocket wheel 45 on the driving shaft 40 and also engaging a sprocket wheel 46 carried on one end of the shaft 43. On the shaft 43 are carried right and left sections of an auger, 47 and 48. Said sections of the auger extend from the partition 18 to the feed openings 25 in the opposite lower end portions of said tubular casing 9. It will therefore be seen that when the slide valves 19 are moved away from the partition 18, the grain in the hopper 3 will find its way down through the hopper support 2 and into the tubular casing 9 through the feed openings 17 therein, upon the opposite sides of the partition 18, and if the wagon is in motion, and movement is transmitted from the driving shaft 40 to the shaft 43, the augers 47 and 48 will transfer the grain from the inner or central body portion of the casing 9 to the opposite outer ends thereof, where the same will be discharged through the feed openings 25, thence down through the feed-ways 26 on to the distributing fans, and such fans will distribute the same evenly over the ground.

I provide an agitating shaft 47$^a$ which passes through the lower portion of the hopper support 2, just above the valve controlled openings 17 in the tubular casing 9, and said agitating shaft 47$^a$ is provided with a series of transversely arranged agitating fingers 48$^a$. This agitating shaft is driven directly from the driving shaft 40, by means of a chain 49 engaging a sprocket wheel 50, carried by the driving shaft 40 and also engaging a sprocket wheel 51 carried on one end of said agitating shaft, see Fig. 1. The agitating shaft 47$^a$ with its agitating fingers 48$^a$ will prevent any clogging in the hopper support 2, which may result from the weight of the grain as it crowds itself down through the hopper or because of particles of straw or other matter finding its way into the grain and will assist the proper feeding of the grain down through the hopper support into the tubular casing 9, where the same is properly transferred to the distributing fans, in the manner previously described.

Figure 2:
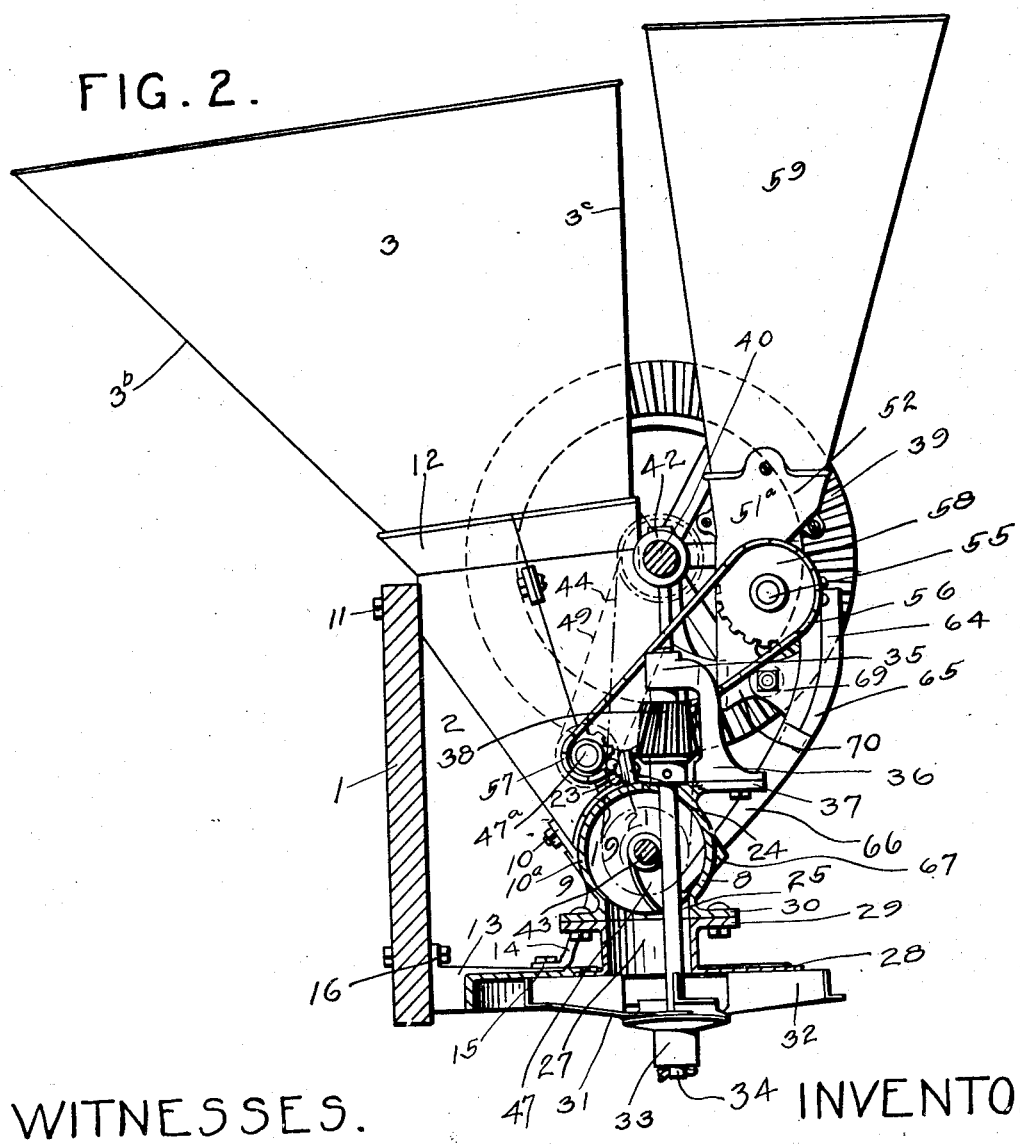

The devices above described, comprise those parts which enter into and form a part of the feeding and distribution of the grain. I will now described the grass seeding attachment and the manner of transferring the grass seed from such attachment to the distributing fans, to be commingled with the grain and distributing same over the ground. This grass seed attachment includes a main hopper support 51ª comprising the half sections 52 bolted or otherwise suitably secured together. Said hopper support 51ª contains a cylindrical chamber 53 in which is revolubly mounted a force feeding roller 54 carried on a shaft 55, said shaft 55 receiving its power from the agitating shaft 47 through and by means of the chain 56 engaging a sprocket pinion 57 on the agitating shaft 47, and also engaging a sprocket wheel 58 carried on one end of the shaft 55. The hopper support 51ª supports the grass seed hopper 59. The parts just described are best seen in Figs. 1, 2 and 3. The hopper support 51ª is supported by ears 60, see Fig. 1, secured to the brackets 42, see Fig. 3. The hopper support 51ª is provided with a feed opening 61 controlled by oppositely placed slide valves 62, which are adjustably secured in position by means of the bolts 63.

The grass seed discharged from the hopper support 51ª through the feed openings 61, will enter the feed-way 64. This feed-way 64 is provided with the diverging spouts 65 to which are attached the spouts 66 and said last mentioned spouts extend into the tubular bosses 67 disposed at or near the opposite ends of the tubular casing. Thus, the grass seed which is discharged into the feed-way 64, will find its way into the opposite ends of the tubular casing 9 through the diverging spouts 65 of the feed-way and the additional spouts 66 attached thereto. The feed-way 64 comprises the two half sections, shown in Fig. 3, which are suitably joined together through the ears 68 and such construction of the feed-way 64 produces a central partition which divides the grass seed as it enters the feed-way so that the same will be evenly directed to the opposite diverging spouts 65. The feed-way 64 is supported by and secured to the hopper support 51ª through ears 69 bolted or otherwise suitably secured to ears 70, forming a part of or attached to said hopper support 51ª.

The grass seed attachment may or may not be used as desired, and in use, the quantity of grass seed sown to the acre may be regulated by the valves 62 in the same manner as the quantity of grain is regulated by means of the slide valves 19.

What I claim is:—

1. In a broadcast distributing machine, in combination, an end-gate, a bracket secured to the end-gate, a casing extending lengthwise of the end-gate and supported by the bracket, a hopper support mounted upon the casing, its upper rear portion secured to the end-gate, a hopper extending up from the hopper support and over the end-gate, distributing fans located at the opposite ends of the casing and beneath the same, a driving shaft, brackets secured to the hopper support and forming a bearing for said driving shaft, means for operating the fans from the driving shaft, a supplemental hopper support supported by the brackets forming a bearing for the driving shaft, a hopper extending up from said supplemental hopper support, a feed-way attached to the supplemental hopper support and having diverging spouts and other spouts connected to said diverging spouts and passing into said casing at or near the opposite ends thereof.

2. In a broadcast distributing machine, in combination, an end-gate, a bracket secured to said end-gate, a casing extending lengthwise of the end-gate and supported by said bracket, a hopper support mounted upon said casing, its upper rear portion being secured to the end-gate, a hopper extending up from said hopper support and over the end-gate, a driving shaft, a feeding means in the casing directly over said driving shaft, distributing fans located at the opposite ends of said casing and beneath the same, means for operating said distributing fans direct from said driving shaft, an agitating shaft in said hopper support, means for operating said agitating shaft direct from said driving shaft, brackets attached to the hopper support and forming a bearing for said driving shaft, a supplemental hopper support supported by said brackets, a hopper extending up from said supplemental hopper support, a feed-way attached to said supplemental hopper support and having diverging spouts, other spouts attached to said diverging spouts and entering said casing at its opposite ends, a feeding means in said supplemental hopper support, and means for driving said last mentioned feeding means from said agitating shaft.

CHARLES P. SESTER.

Witnesses:
CHAS. N. LA PORTE,
J. M. ANDERSON.